(12) United States Patent
Hsu et al.

(10) Patent No.: US 11,100,157 B2
(45) Date of Patent: *Aug. 24, 2021

(54) DETERMINING RECOMMENDED MEDIA PROGRAMMING FROM SPARSE CONSUMPTION DATA

(71) Applicant: The DIRECTV Group, Inc., El Segundo, CA (US)

(72) Inventors: Raymond Hsu, Irvine, CA (US); Ashok Sahu, Kirkland, WA (US)

(73) Assignee: THE DIRECTV GROUP, INC., El Segundo, CA (US)

(*) Notice: Subject to any disclaimer, the term of this patent is extended or adjusted under 35 U.S.C. 154(b) by 225 days.

This patent is subject to a terminal disclaimer.

(21) Appl. No.: 16/292,063

(22) Filed: Mar. 4, 2019

(65) Prior Publication Data
US 2019/0197051 A1 Jun. 27, 2019

Related U.S. Application Data

(63) Continuation of application No. 15/289,626, filed on Oct. 10, 2016, now Pat. No. 10,223,359.

(51) Int. Cl.
G06F 16/48 (2019.01)
G06F 17/16 (2006.01)

(52) U.S. Cl.
CPC .............. *G06F 16/48* (2019.01); *G06F 17/16* (2013.01)

(58) Field of Classification Search
CPC .................................. G06F 16/48; G06F 17/16
(Continued)

(56) References Cited

U.S. PATENT DOCUMENTS 5,483,278 A 1/1996 Strubbe et al.
5,583,763 A 12/1996 Atcheson et al.
(Continued)

FOREIGN PATENT DOCUMENTS

CN 103167330 A 6/2013
JP 2013109427 A * 6/2013
(Continued)

OTHER PUBLICATIONS

Bi et al., "Learning to Recommend Related Entities to Search Users," WSDM' 15, Feb. 2-6, 2015, Shanghai, China, pp. 139-148. (Year: 2015).*
(Continued)

*Primary Examiner* — Phuong Thao Cao

(57) ABSTRACT

A processor may create a preference vector by generating preference vector entries in fields that correspond to content attributes associated with at least one media program presented via a media device, each entry including a playback duration and a year. The processor may create a media entity matrix of entity vectors for entities associated with production of media programs. For each entity vector, the processor may generate matrix entries in fields that correspond to content attributes associated with at least one media program associated with the entity, each matrix entry including a year and a score, the score weighted by an epoch factor based upon a time span associated with the at least one media program presented via the media device. The processor may determine entity rankings based upon dot products between the preference vector and the entity vectors and provide a recommendation based upon the rankings.

20 Claims, 6 Drawing Sheets

(58) Field of Classification Search
USPC .......................................................... 707/748
See application file for complete search history.

(56) References Cited

U.S. PATENT DOCUMENTS

| | | | |
|---|---|---|---|
| 6,438,579 B1 | 8/2002 | Hosken | |
| 6,446,261 B1 | 9/2002 | Rosser | |
| 6,545,209 B1 | 4/2003 | Flannery et al. | |
| 7,434,244 B2 | 10/2008 | Popov et al. | |
| 7,840,986 B2 | 11/2010 | Ali et al. | |
| 7,853,600 B2 | 12/2010 | Herz et al. | |
| 8,204,883 B1* | 6/2012 | Smith | G06Q 30/02 707/736 |
| 8,266,157 B2 | 9/2012 | Carmel et al. | |
| 8,301,692 B1* | 10/2012 | Hamaker | G06Q 30/0631 709/203 |
| 8,805,851 B2 | 8/2014 | Koike et al. | |
| 8,843,965 B1* | 9/2014 | Kurapati | H04N 21/47 725/46 |
| 8,990,403 B2 | 3/2015 | Park et al. | |
| 8,996,529 B2 | 3/2015 | Gross et al. | |
| 9,110,955 B1* | 8/2015 | Bernhardsson | G06F 16/24578 |
| 9,215,423 B2 | 12/2015 | Kimble et al. | |
| 9,219,736 B1* | 12/2015 | Lewis | H04L 67/16 |
| 9,454,580 B2* | 9/2016 | Nice | G06F 16/24575 |
| 9,558,501 B2 | 1/2017 | Sakamoto et al. | |
| 9,691,035 B1 | 6/2017 | Sandler | |
| 10,713,702 B1* | 7/2020 | Langdon | G06Q 30/0205 |
| 2005/0165782 A1* | 7/2005 | Yamamoto | G06F 16/40 |
| 2006/0074861 A1* | 4/2006 | Wilensky | G06F 16/3322 |
| 2008/0215565 A1 | 9/2008 | Sun et al. | |
| 2009/0138457 A1* | 5/2009 | Askey | G06F 16/4387 |
| 2009/0222857 A1 | 9/2009 | Nagano | |
| 2010/0251305 A1 | 9/2010 | Kimble et al. | |
| 2010/0262570 A1 | 10/2010 | Tateno et al. | |
| 2011/0125763 A1* | 5/2011 | Takanen | G06F 16/435 707/749 |
| 2011/0145263 A1 | 6/2011 | Sakamoto et al. | |
| 2011/0191716 A1 | 8/2011 | Sakamoto et al. | |
| 2012/0030020 A1 | 2/2012 | Bucak et al. | |
| 2012/0054278 A1 | 3/2012 | Taleb et al. | |
| 2012/0330444 A1 | 12/2012 | Sloan et al. | |
| 2013/0073983 A1 | 3/2013 | Rasmussen et al. | |
| 2013/0110848 A1* | 5/2013 | Svendsen | G06F 16/435 707/748 |
| 2013/0178962 A1 | 7/2013 | DiMaria et al. | |
| 2013/0179786 A1 | 7/2013 | Bolton, Jr. | |
| 2013/0268557 A1 | 10/2013 | Pickersgill et al. | |
| 2014/0040274 A1* | 2/2014 | Aravamudan | G06F 16/3322 707/741 |
| 2014/0122590 A1* | 5/2014 | Svendsen | G06Q 30/0631 709/204 |
| 2014/0280140 A1 | 9/2014 | Ling et al. | |
| 2014/0280223 A1* | 9/2014 | Ram | G06F 3/0488 707/748 |
| 2014/0331264 A1 | 11/2014 | Schneiderman et al. | |
| 2014/0351207 A1 | 11/2014 | Saito et al. | |
| 2014/0358898 A1* | 12/2014 | Lehtiniemi | G06F 16/4387 707/722 |
| 2015/0019640 A1 | 1/2015 | Li et al. | |
| 2015/0046951 A1 | 2/2015 | Arunachalam et al. | |
| 2015/0052003 A1 | 2/2015 | Tang et al. | |
| 2015/0112801 A1* | 4/2015 | Nice | G06Q 30/0269 705/14.53 |
| 2015/0134653 A1 | 5/2015 | Bayer et al. | |
| 2015/0142785 A1 | 5/2015 | Roberts et al. | |
| 2015/0178379 A1 | 6/2015 | Yamamoto et al. | |
| 2015/0193548 A1 | 7/2015 | Nice et al. | |
| 2015/0205511 A1* | 7/2015 | Vinna | G06F 3/0481 715/716 |
| 2015/0234457 A1 | 8/2015 | Kempinski | |
| 2015/0309844 A1 | 10/2015 | Lowe et al. | |
| 2015/0379021 A1 | 12/2015 | Kuper | |
| 2016/0004699 A1 | 1/2016 | Liu et al. | |
| 2016/0042076 A1 | 2/2016 | Huang et al. | |
| 2016/0071182 A1* | 3/2016 | Nogues | G06F 16/435 705/26.7 |
| 2016/0098640 A1 | 4/2016 | Su | |
| 2016/0112761 A1* | 4/2016 | Venkataraman | H04N 21/252 725/14 |
| 2016/0147767 A1* | 5/2016 | Manning | G06F 16/4387 715/716 |
| 2016/0188725 A1 | 6/2016 | Wang et al. | |
| 2016/0196580 A1* | 7/2016 | Hong | G06Q 30/0269 705/14.53 |
| 2016/0212484 A1 | 7/2016 | Kimble et al. | |
| 2017/0031920 A1* | 2/2017 | Manning | G06F 16/435 |
| 2017/0083522 A1* | 3/2017 | Somekh | G06F 16/2237 |
| 2017/0094332 A1* | 3/2017 | Thomas | H04N 21/25891 |
| 2017/0193390 A1* | 7/2017 | Weston | G06N 3/08 |
| 2017/0206549 A1 | 7/2017 | Chaudhuri et al. | |
| 2017/0337481 A1 | 11/2017 | Trouillon et al. | |
| 2018/0089311 A1 | 3/2018 | Soni et al. | |
| 2018/0101531 A1* | 4/2018 | Hsu | G06F 17/16 |
| 2018/0150897 A1* | 5/2018 | Wang | G06F 16/635 |

FOREIGN PATENT DOCUMENTS

| | | |
|---|---|---|
| WO | 2015094311 A1 | 6/2015 |
| WO | 2016114653 A1 | 7/2016 |

OTHER PUBLICATIONS

Surcouf et al., "Application of Kolmogorov Complexity to TV Content Similarity," An IP.com Prior Art Database Technical Disclosure, Aug. 19, 2014, pp. 1-8. (Year: 2014).*

Choi, Sang-Min "A Movie Recommendation Algorithm Based on Genre Correlations". Jul. 2012. pp. 1-8.

Wang, Zan "An Improved Collaborative Movie Recommendation System Using Computational Intelligence". 2014. pp. 1-9.

Bu et al., "Music Recommendation by Unified Hypergraph: Combining Social Media Information and Music Content", in Proceedings of the 18th ACM International Conference on Multimedia, Firenze, Itlay, Oct. 25-29, 2010, pp. 391-400. (Year: 2010).

Demartini et al., "A Vector Space Model for Ranking Entities and Its Application to expert Search", M. Boughanem et al. (Eds.): ECIR 2009, LNCS 5478, pp. 189-201, 2009. (Year: 2009).

\* cited by examiner

310

| ATTRIBUTE | 1 | 7 | 11 | 15 | 20 |
|---|---|---|---|---|---|
| U1 CUMULATIVE | 6.36 | 4.02 | 7.3 | 3.94 | 1.73 |
| U1 NORMALIZED | 0.27 | 0.17 | 0.31 | 0.17 | 0.07 |
| U1 CUMULATIVE (CONSUMPTION MODE WEIGHTED) | 7.3 | 4.86 | 8.18 | 4.72 | 2.2 |
| U1 NORMALIZED (CONSUMPTION MODE WEIGHTED) | 0.27 | 0.18 | 0.3 | 0.17 | 0.08 |

320

| CONSUMPTION MODE WEIGHT | | |
|---|---|---|
| METHOD | COUNT | WEIGHT |
| LIVE | 10 | 1.04 |
| PURCHASE | 1 | 1.35 |
| PLAYBACK | 3 | 1.26 |
| DOWNLOAD | 1 | 1.35 |

330

| NORMALIZED PREFERENCE VECTORS (WITH CONSUMPTION MODE WEIGHTING) | | | | | | EPOCH |
|---|---|---|---|---|---|---|
| | 1 | 7 | 11 | 15 | 20 | 2000:8 |
| U1 | 0.27 | 0.18 | 0.3 | 0.17 | 0.08 | |
| U2 | ... | ... | ... | ... | ... | ... |
| Un | ... | ... | ... | ... | ... | ... |

410 — RAW ENTITY MATRIX

| | 1 | 6 | 7 | 9 | 11 |
|---|---|---|---|---|---|
| E1 | 2002:0.71, 2012:0.64, 2000:0.45 | 2002:0.75 | 1998:0.80, 1999:0.69, 2009:0.59, 2003:0.40, 2004:0.65, 2007:0.68, 2001:0.66 | 2009:0.78 | 1995:0.50, 2001:0.66, 2009:0.78, 2009:0.53, 2012:0.64, 2009:0.74, 1995:0.69, 2002:0.75, 2001:0.80 |
| E2 | ... | | | ... | ... |
| En | ... | | ... | | |

420

| ATTRIBUTE | 1 | 6 | 7 | 9 | 11 |
|---|---|---|---|---|---|
| E1 CUMULATIVE | 2.25 | 0.75 | 4.47 | 0.78 | 5.85 |
| E1 NORMALIZED | 0.38 | 0.13 | 0.76 | 0.13 | 1 |
| E1 CUMULATIVE (USER EPOCH WEIGHTED) | 2.03 | 0.75 | 4.41 | 0.78 | 5.67 |
| E1 NORMALIZED (USER EPOCH WEIGHTED) | 0.36 | 0.13 | 0.79 | 0.14 | 1 |

430 — PERSONALIZED ENTITY MATRIX

| | 1 | 6 | 7 | 9 | 11 |
|---|---|---|---|---|---|
| E1 | .36 | .13 | .79 | .14 | 1 |
| E2 | ... | | | | |
| En | ... | | | | |

FIG. 4

DETERMINING RECOMMENDED MEDIA PROGRAMMING FROM SPARSE CONSUMPTION DATA

This application is a continuation of U.S. patent application Ser. No. 15/289,626, filed Oct. 10, 2016, now U.S. Pat. No. 10,223,359, which is herein incorporated by reference in its entirety.

The present disclosure relates generally to making recommendations based upon media consumption of a user, and more particularly to devices, non-transitory computer-readable media, and methods for determining entity rankings of entities associated with production of media programs and providing a recommendation based upon the entity rankings.

BACKGROUND

Content recommendation services may recommend additional content to a user based upon the current content being consumed, based upon a history of a user's content consumption, or based upon a user profile. For example, content that is deemed similar to a current content being consumed may be recommended to the user. Recommendations may also be based upon content that is deemed popular in general, or that is popular with users who are similar to a user for whom a recommendation is being generated. However, such recommendations may be inaccurate or irrelevant to actual interests of the user when there is no user profile or little content consumption which may be considered.

SUMMARY

In one embodiment, the present disclosure describes a device, computer-readable medium and method for determining entity rankings of entities associated with production of media programs and providing a recommendation based upon the entity rankings. For instance, in one example, a processor may receive a data set identifying at least one media program presented via a media device and create a preference vector that includes a plurality of fields corresponding to a plurality of content attributes. In one example, the creating the preference vector includes generating preference vector entries in fields of the plurality of fields that correspond to content attributes associated with the at least one media program presented via the media device. In one example, each of the preference vector entries comprise a playback duration of one of the at least one media program presented via the media device and a year of the one of the at least one media program presented via the media device. The processor may further create a media entity matrix comprising entity vectors for a plurality of entities associated with a production of a plurality of media programs, each entity vector including the plurality of fields corresponding to the plurality of content attributes. In one example, the creating the media entity matrix includes, for each entity vector, generating matrix entries in fields that correspond to content attributes associated with at least one media program associated with the entity. In one example, each matrix entry comprises a year of one of the at least one media program associated with the entity and a score of the one of the at least one media program associated with the entity, where the score is weighted by an epoch factor that is based upon a time span that is associated with the at least one media program presented via the media device. The processor may then determine entity rankings based upon dot products between the preference vector and the entity vectors of the media entity matrix and provide a recommendation based upon the entity rankings.

BRIEF DESCRIPTION OF THE DRAWINGS

The teachings of the present disclosure can be readily understood by considering the following detailed description in conjunction with the accompanying drawings, in which:

FIG. 3 illustrates an example set of tables comprising a table of preference vector calculations, a table for consumption mode weight calculations, and a table of normalized preference vectors with consumption mode weighting;

FIG. 4 illustrates an example set of tables associated with converting a raw entity matrix into a media entity matrix that is personalized to a user;

To facilitate understanding, identical reference numerals have been used, where possible, to designate identical elements that are common to the figures.

DETAILED DESCRIPTION

Figure 1:
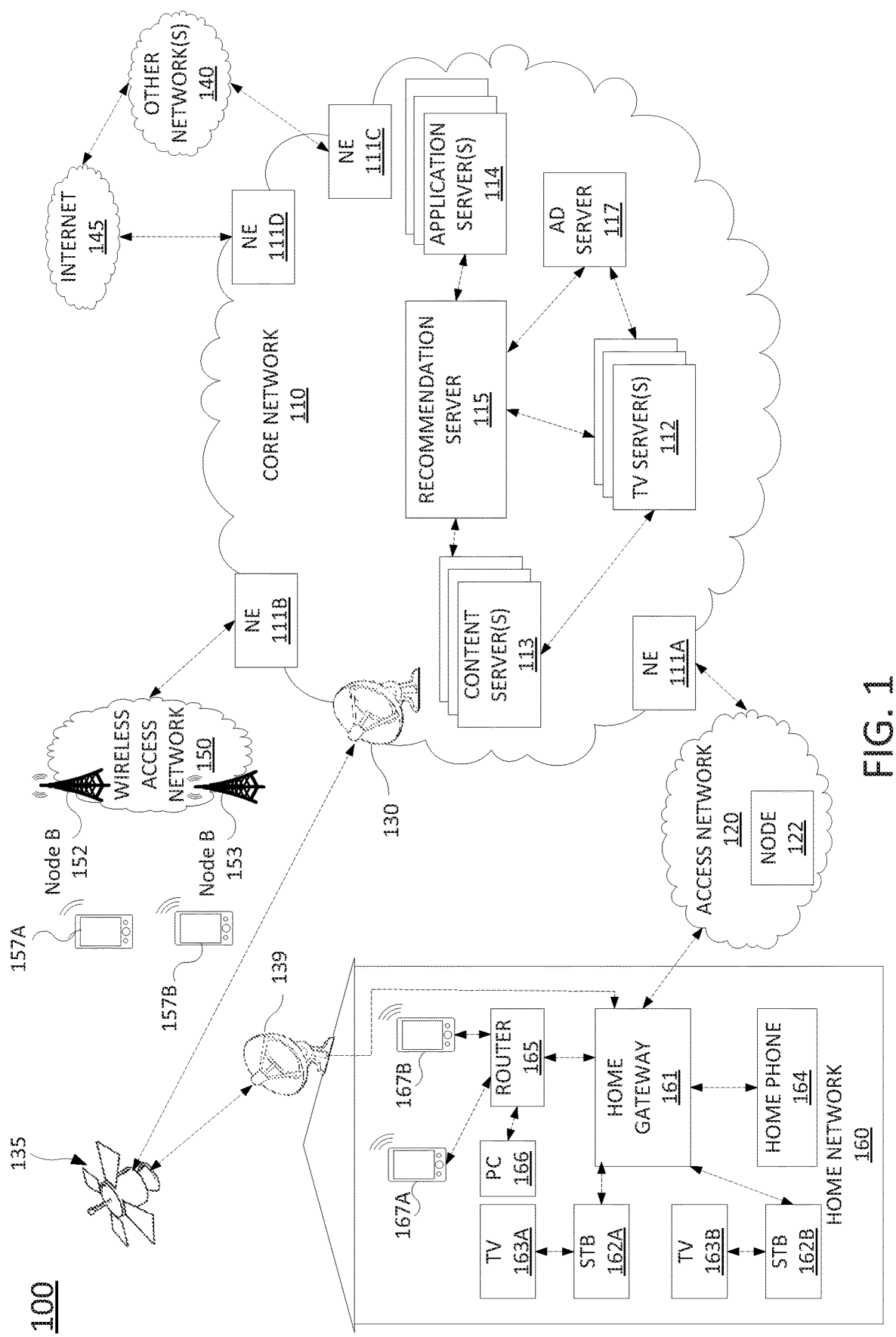
FIG. 1 illustrates an example network related to the present disclosure.

Recommendation Systems (RS) generally utilize Content Based (CB) or Collaborative Filtering (CF) in the generation of recommended content. However, for users with sparse viewing history, these methods may fail to generate a reasonably sized or diverse recommendation set.

Examples of the present disclosure create an entity matrix comprising rows, or vectors corresponding to different entities associated with different media programs, such as cast members of various film different content, and columns corresponding to attributes of the different media programs, such as keywords, genres, themes, etc. For instance, for a particular cast member, a first film in which the cast member has appeared is considered. The cast member may be identified as having appeared in the film based upon public or non-public data source(s). The keywords, genres, themes, etc. for the film are also extracted from the data source(s). Entries are then made in the row for the cast member within the column(s) corresponding to the keywords, genres, themes, etc. that are identified for that particular film. Each entry in the entity matrix may comprise the year of the film and a rating (e.g., scaled from zero to one) for the film. The same process is repeated for each film or other media program in which the cast member has appeared. In addition, the same process is repeated for numerous other cast members in the same film and in different films. Thus, each cell or field (i.e., each row-column pair in the entity matrix) may have zero, one, or several entries depending upon whether the particular cast member has appeared in none, few, or many films, shows, etc. which touch upon the keywords, genres, themes, etc. for a column containing the cell or field. In one example, the entity matrix is normalized based upon the maximum row value for each entity vector, or row.

In accordance with the present disclosure, a user preference vector may also be created with columns comprising keywords, genres, themes, and the like. For example, for each media program presentation associated with a user, a device, an account, etc., entries are made in the columns which correspond to the keywords, genres, themes, etc. for the media program. The keywords, genres, themes, etc. may be taken from the same data source(s) used to create the entity matrix. Thus, each column may have zero entries, one entry, or more than one entry. Unlike the cast matrix, however, entries in the user vector may comprise a year of the media program, a value between zero and one, indicating what percentage of the total duration of the media program was presented, and a weighting factor based upon the mode of consumption, e.g., live programming, on demand, purchase, download, etc. For each media program that is presented, there may be several identical entries in different columns corresponding to different keywords, genres, themes, etc.

In one example, a user's preferences are then matched to one or more media entities. In one example, this is accomplished by taking the dot product between the user preference vector and the entity vectors/rows of the entity matrix, and sorting to determine respective ranks. For instance, the top 5, top 10 or some other number of entities that are top ranked may be identified as recommended entities based upon the user's media program consumption history. In one example, media program(s) associated with the recommended entity or entities may also be identified a recommended content.

Notably, success towards a specific parameter is based on media critic or user ratings/scores for the different media programs associated with an entity. In addition, in one example, the ratings in the entries of the entity matrix may be weighed against a user epoch. For example, entities, such as film cast members from decades ago may carry less weight for a user that prefers new content. In one example, the user epoch is considered as the median year among the years of all content that the user has viewed (and a standard deviation). In one example, the user epoch is then used to weight the entity matrix. After weighting, relevance scores between the user and the various entities may be determined (e.g., by the dot product between the user vector and the entity vectors of the entity matrix), and the entities are then sorted into a ranked list, as described above.

Current offerings and standards of content recommendations do not provide a robust and personalized solution for low consumption users. The present approach goes beyond standard content based solutions to build an abstract space used to transform attributes into relevant metrics of affinity. The solution also allows for accurate extrapolations in dimensions of content and similar attributes. These and other aspects of the present disclosure are described in greater detail below in connection with the examples of FIGS. 1-6.

To better understand the present disclosure, FIG. 1 illustrates an example network 100, related to the present disclosure. As shown in FIG. 1, the network 100 connects mobile devices 157A, 157B, 167A and 167B, and home network devices such as home gateway 161, set-top boxes (STBs) 162A, and 162B, television (TV) 163A and 163B, home phone 164, router 165, personal computer (PC) 166, and so forth, with one another and with various other devices via a core network 110, a wireless access network 150 (e.g., a cellular network), an access network 120, other networks 140 and/or Internet 145.

In one embodiment, wireless access network 150 comprises a radio access network implementing such technologies as: global system for mobile communication (GSM), e.g., a base station subsystem (BSS), or IS-95, a universal mobile telecommunications system (UMTS) network employing wideband code division multiple access (WCDMA), or a CDMA3000 network, among others. In other words, wireless access network 150 may comprise an access network in accordance with any "second generation" (2G), "third generation" (3G), "fourth generation" (4G), Long Term Evolution (LTE) or any other yet to be developed future wireless/cellular network technology. While the present disclosure is not limited to any particular type of wireless access network, in the illustrative embodiment, wireless access network 150 is shown as a UMTS terrestrial radio access network (UTRAN) subsystem. Thus, elements 152 and 153 may each comprise a Node B or evolved Node B (eNodeB).

In one embodiment, each of mobile devices 157A, 157B, 167A, and 167B may comprise any subscriber/customer endpoint device configured for wireless communication such as a personal computer, a laptop computer, a Wi-Fi device, a Personal Digital Assistant (PDA), a mobile phone, a smartphone, a smart television, or smart TV, an email device, a computing tablet, a messaging device, and the like. In one embodiment, any one or more of mobile devices 157A, 157B, 167A, and 167B may have both cellular and non-cellular access capabilities and may further have wired communication and networking capabilities.

As illustrated in FIG. 1, network 100 includes a core network 110. In one example, core network 110 may combine core network components of a cellular network with components of a triple play service network; where triple-play services include telephone services, Internet services and television services to subscribers. For example, core network 110 may functionally comprise a fixed mobile convergence (FMC) network, e.g., an IP Multimedia Subsystem (IMS) network. In addition, core network 110 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Core network 110 may also further comprise a broadcast television network, e.g., a traditional cable provider network or an Internet Protocol Television (IPTV) network, as well as an Internet Service Provider (ISP)) network. The network elements 111A-111D may serve as gateway servers or edge routers to interconnect the core network 110 with other networks 140, Internet 145, wireless access network 150, access network 120, and so forth. As shown in FIG. 1, core network 110 may also include a plurality of television (TV) servers 112, a plurality of content servers 113, a plurality of application servers 114, an advertising server 117, and a recommendation server 115 (e.g., an application server). For ease of illustration, various additional elements of core network 110 are omitted from FIG. 1.

With respect to television service provider functions, core network 110 may include one or more television servers 112 for the delivery of television content, e.g., a broadcast server, a cable head-end, a video-on-demand (VoD) server, and so forth. For example, core network 110 may comprise a video super hub office, a video hub office and/or a service office/central office. In this regard, television servers 112 may interact with content servers 113, advertising server 117 and recommendation server 115 to select which content to provide to the home network 160 and others.

In one example, content servers 113 may store scheduled national television broadcast content for a number of television channels, video-on-demand programming, local programming content, and so forth. For example, content providers may upload various contents to the core network to be distributed to various subscribers.

In one example, advertising server 117 stores a number of advertisements that can be selected for presentation to viewers, e.g., in the home network 160 and at other downstream viewing locations. For example, advertisers may upload various advertising content to the core network to be distributed to various viewers.

In addition, the access network 120 may comprise a Digital Subscriber Line (DSL) network, a broadband cable access network, a Local Area Network (LAN), a cellular or wireless access network, a $3^{rd}$ party network, and the like. For example, the operator of core network 110 may provide a cable television service, an IPTV service, or any other type of television service to subscribers via access network 120. In this regard, access network 120 may include a node 122, e.g., a mini-fiber node (MFN), a video-ready access device (VRAD) or the like. However, in another embodiment node 122 may be omitted, e.g., for fiber-to-the-premises (FTTP) installations. Access network 120 may also transmit and receive communications between home network 160 and core network 110 relating to voice telephone calls, communications with web servers via the Internet 145 and/or other networks 140, and so forth.

Alternatively, or in addition, the network 100 may provide television services to home network 160 via satellite broadcast. For instance, ground station 130 may receive television content from television servers 112 for uplink transmission to satellite 135. Accordingly, satellite 135 may receive television content from ground station 130 and may broadcast the television content to satellite receiver 139, e.g., a satellite link terrestrial antenna (including satellite dishes and antennas for downlink communications, or for both downlink and uplink communications), as well as to satellite receivers of other subscribers within a coverage area of satellite 135. In one example, satellite 135 may be controlled and/or operated by a same network service provider as core network 110. In another example, satellite 135 may be controlled and/or operated by a different entity and may carry television broadcast signals on behalf of core network 110.

As illustrated in FIG. 1, core network 110 may include various application servers 114. For instance, application servers 114 may be implemented to provide certain functions or features, e.g., a Serving—Call Session Control Function (S-CSCF), a Proxy—Call Session Control Function (P-CSCF), or an Interrogating—Call Session Control Function (I-CSCF), one or more billing servers for billing one or more services, including cellular data and telephony services, wire-line phone services, Internet access services, and television services. Application servers 114 may also include a Home Subscriber Server/Home Location Register (HSS/HLR) for tracking cellular subscriber device location and other functions. An HSS refers to a network element residing in the control plane of an IMS network that acts as a central repository of all customer specific authorizations, service profiles, preferences, etc. Application servers 114 may also include an IMS media server (MS) for handling and terminating media streams to provide services such as announcements, bridges, and Interactive Voice Response (IVR) messages for VoIP and cellular service applications. The MS may also interact with customers for media session management. In addition, application servers 114 may also include a presence server, e.g., for detecting a presence of a user. For example, the presence server may determine the physical location of a user or whether the user is "present" for the purpose of a subscribed service, e.g., online for a chatting service and the like. Application servers 114 may further include business information database (BID) storage servers. For instance, the network operator of core network 110 may receive and store third-party information relating to subscribers.

In one example, application servers 114 may include data storage servers to receive and store third-party information regarding the media programs (e.g., movies, television programming, and other content) maintained within content servers 113 and/or other media content. For instance, application servers 114 comprising one or more data storage servers may receive a media program data set that includes a plurality of media records for a plurality of media programs from a device of a third-party, e.g., via the Internet 145, other networks 140, etc. The third-party may comprise, for example, an entity that maintains a database storing information for various media programs, entities that are associated with such media programs, scores, or ratings for such media programs given by critics and/or the general public, and so forth. In one example, application servers 114 may represent a distributed file system, e.g., a Hadoop® Distributed File System (HDFS™), or the like. In one example, the application servers 114 may receive and store multiple media program data sets from different third-parties. In addition, in one example, the application servers 114 may also store user preference vectors and a media entity matrix, which may be generated from one or more media program data sets. It should be noted that the foregoing are only several examples of the types of relevant application servers 114 that may be included in core network 110 for storing information relevant to providing personalized content to a subscriber.

In one example, home network 160 may include a home gateway 161, which receives data/communications associated with different types of media, e.g., television, phone, and Internet, and separates these communications for the appropriate devices. The data/communications may be received via access network 120 and/or via satellite receiver 139, for instance. In one example, television data is forwarded to set-top boxes (STBs) 162A, and 162B to be decoded and forwarded to televisions 163A, and 163B for presentation. Similarly, telephone data is sent to and received from home phone 164; Internet communications are sent to and received from router 165, which may be capable of both wired and/or wireless communication. In turn, router 165 receives data from and sends data to the appropriate devices, e.g., personal computer (PC) 166, mobile devices 167A, and 167B, and so forth. In one example, router 165 may further communicate with TV (broadly a display) 163A and/or 163B, e.g., where one or both of the televisions is a smart TV.

As illustrated in FIG. 1, core network 110 also includes a recommendation server 115. In one example, the recommendation server 115 may comprise a computing system or server, such as computing system 600 depicted in FIG. 6, and may be configured to provide one or more operations or functions for determining entity rankings of entities associated with production of media programs and providing a recommendation based upon the entity rankings, as described herein. It should be noted that as used herein, the terms "configure" and "reconfigure" may refer to programming or loading a computing device with computer-readable/computer-executable instructions, code, and/or programs, e.g., in a memory, which when executed by a processor of the computing device, may cause the computing device to perform various functions. Such terms may also encompass providing variables, data values, tables, objects, or other data structures or the like which may cause a computer device executing computer-readable instructions, code, and/or programs to function differently depending upon the values of the variables or other data structures that are provided. Among other things, recommendation server 115 may receive a data set identifying at least one media program presented via at least one media device, create a user preference vector based upon the data set, create a media entity matrix based upon a media program data set (e.g., stored by one or more of application servers 114), determine entity rankings based upon dot products between the preference vector and entity vectors of the media entity matrix, and provide a recommendation, e.g., a recommended entity, such as an actor/actress, director, composer, etc., or a recommended media program, based upon the ranking.

In one example, the data set identifying at least one media program presented via at least one media device may be received from at least one of television servers 112. For instance, the at least one of television servers 112 may track the presentation of media programs via media devices such as set top boxes 161A and 162B, TVs 163A and 163B, home gateway 161, and so forth. In one example, the at least one of television servers 112 may track the presentation of media programs via multiple media devices associated with home network 160, a subscriber account associated with home network 160, or for individual viewers associated with home network 160 and/or the subscriber account. Alternatively, or in addition, the data set may be received from at least one of application servers 114. For instance, the at least one of application servers 114 may track media programs presented via the media devices mentioned above, as well as media programs presented via PC 166, mobile devices 157A, 157B, 167A and 167B, and so forth. For instance, if an individual is a subscriber associated with home network 160 and is also a subscriber associated with mobile device 157B, then media presented via mobile device 157B may be tracked and aggregated with media program presentation information relating to the subscriber gathered from media programs that are presented via one or more media devices in home network 160. In this regard, any one or more devices within home network 160 and/or core network 110 may be configured to create a record noting the presentation of a particular media program via a media device and to report the presentation of the particular media program to the at least one of television servers 112 and/or the at least one of application servers 114.

In one example, the recommendation generated by recommendation server 115 may be passed to television servers 112 for presentation via the media device. For instance, television servers 112 may send instructions to STB 162A and/or STB 162B via home gateway 161 to display the recommendation via TV 163A and/or TV 163B on a portion of a home screen, a screen presenting a programming guide, a screen for video-on-demand media content selection, and so forth. Alternatively, or in addition, the recommendation may be transmitted to a user/subscriber associated with home network 160 via email, or in connection with the viewing of additional media program(s) via PC 166, mobile devices 167A and 167B, and so forth. Further details regarding the functions that may be implemented by recommendation server 115 are discussed in greater detail below in connection with the example method 500 of FIG. 5.

In addition, those skilled in the art will realize that the network 100 may be implemented in a different form than that illustrated in FIG. 1, or may be expanded by including additional endpoint devices, access networks, network elements, application servers, etc. without altering the scope of the present disclosure. For example, core network 110 is not limited to an IMS network. Wireless access network 150 is not limited to a UMTS/UTRAN configuration. Similarly, the present disclosure is not limited to an IP/MPLS network for VoIP telephony services, or any particular type of broadcast television network for providing television services, and so forth. It should also be noted that although the present disclosure is described primarily in connection with video-based media programs, e.g., television, movies, etc., in other, further, and different examples, the present disclosure may alternatively or additionally apply to other types of media programs, such as music and other types of audio programming. For example, an Internet based music streaming service may be provided that tracks the presentation of music content via one or more media devices associated with a user, and may generate recommended songs, albums, artists, bands/groups, etc.

Figure 2:
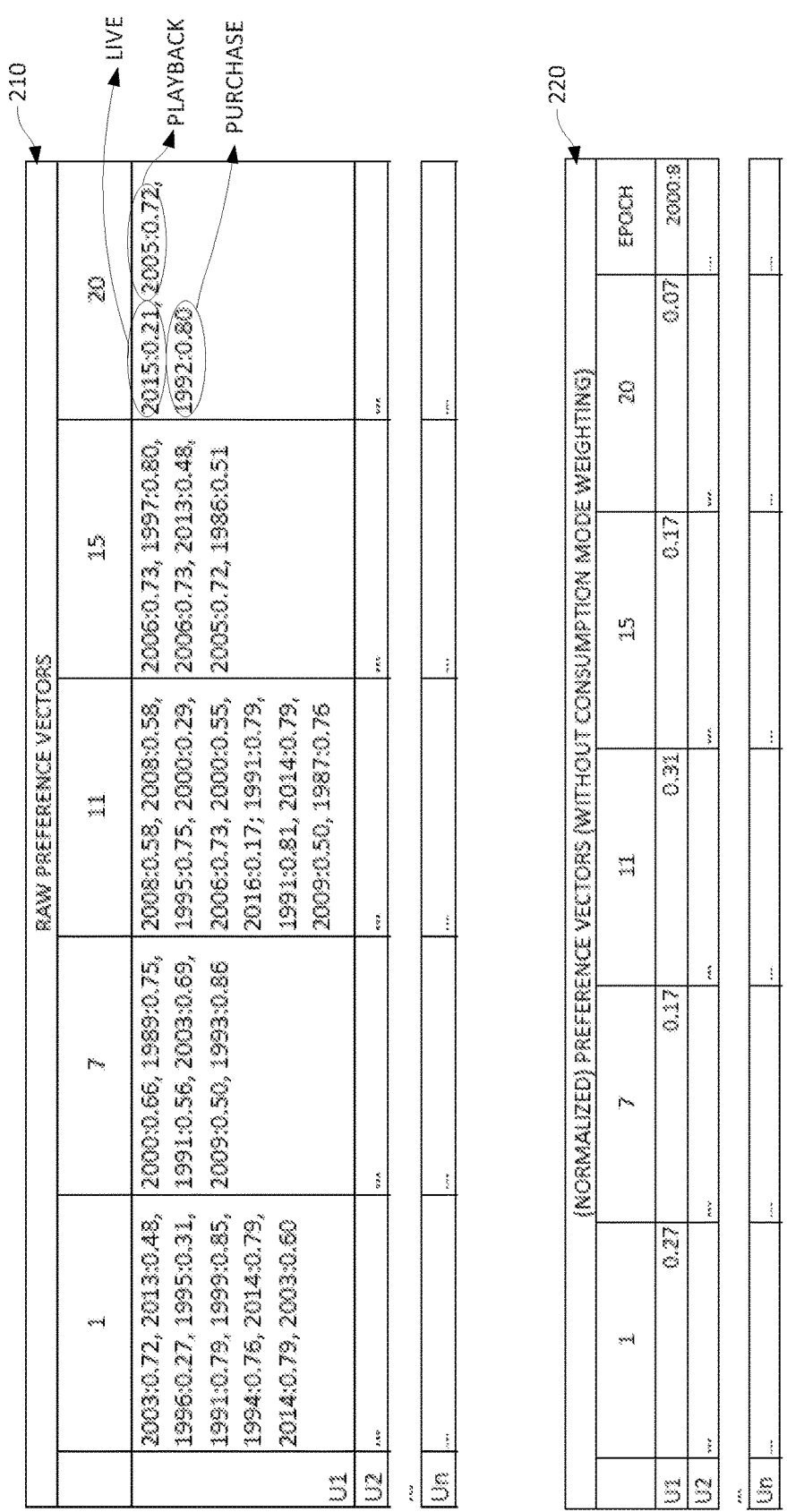
FIG. 2 illustrates an example set of tables comprising a table of raw preference vectors and a table of normalized preference vectors.

FIG. 2 illustrates an example set 200 comprising a table 210 of raw preference vectors and a table 220 of normalized preference vectors calculated therefrom. As illustrated in FIG. 2, the table 210 includes a number of preference vectors for users U1, U2 . . . Un, where n is the total number of users. With respect to the raw preference vector for user U1, i.e., the row of table 210 corresponding to U1, there are a number of fields associated with five columns, labeled as columns 1, 7, 11, 15, and 20. In one example, the fields, or columns, correspond to different attributes of various media programs that may be presented (e.g., viewed, watched, listened to, etc.) via one or more devices associated with the user U1. The attributes may include themes, subject matter, moods, genres, character types, keywords, and the like which relate to the various media programs. For example, column 1 in table 210 (and the fields of each raw preference vector associated with column 1) may relate to a genre of "western", while column 7 may correspond to "documentary". It should be noted that there may be additional columns/fields which are omitted from the illustration. For example, there may be additional columns/fields 2-6 which relate to other genres. However, since the user U1 may not have consumed any media programs related to these genres, the fields/columns have been omitted from illustration in the figure.

For the raw preference vector for user U1 in table 210, within the various fields corresponding to the columns 1, 7, 11, 15, and 20 are one or more entries (broadly, "preference vector entries"). Each entry comprises a year followed by a colon and a number ranging between 0.01 and 1. The year relates to a year in which a particular media program was produced. The number between 0.01 and 1 correspond to a percentage of the total duration of the media program which has been presented via the device(s) associated with the user U1. For example, for the raw preference vector of user U1, the first entry in the field of column 1 is "2003:0.72". Therefore, a media program from the year 2003 was presented via a device associated with the user U1, and 72 percent of the total media program was presented. It should be noted that there may be multiple entries within each field. For example, in the field corresponding to column 1 for the raw preference vector for user U1 there are ten entries. In this case, there has been ten different media programs presented via devices associated with the user U1 which are associated with the same attribute, e.g., the genre of "western". It should also be noted that each media program may have multiple attributes. For example, a film may be categorized as both a "western" and a "comedy". Thus, there may be entries in multiple fields/columns for the same media program. In the example, of FIG. 1, it can be seen that the entry "2013:0.48" appears in the fields for both column 1 and column 15 within the raw preference vector for user U1 within table 210. These repeat entries may indicate the same media program, which is associated with both the attribute of column 1 and the attribute of column 15. Similarly, the entry "1991:0.79" appears in the fields for both column 1 and column 11.

In one example, media program consumption data relating to user U1 may be collected and corresponding entries may be populated into the raw preference vector for user U1 in the table 210. In one example, a normalized preference vector may then be calculated from the raw user preference and populated into table 220. For instance, the raw preference vector may be created in table 210 and a normalized preference vector may be derived therefrom when user U1 consumes an initial media program. The raw preference vector may be updated in table 210 as the user U1 consumes more media programming. In addition, the normalized preference vector may also be updated, e.g., as the media programming is consumed, or on a periodic basis or other basis, such as once per hour, once per day, etc.

In one example, a normalized preference vector may be generated and stored in table 220. In one example, the table 220 has the same columns as contained in the table 210 (and hence the preference vectors of table 220 have the same fields as the raw preference vectors of table 210). With respect to user U1, a (normalized) preference vector may be calculated, e.g., using sum normalization, as follows. For each field of the raw preference vector for user U1 in table 210, the second portions of all of the entries (e.g., the percentage of the total duration of the media program which has been presented) are cumulated/totaled to generate per-field totals. The per-field totals are then summed, and the per-field total for each field is then divided by this sum to generate the entry for the same corresponding field/column within the normalized preference vector for user U1 within table 220. The results of such calculations are shown in the fields of the preference vector for user U1, i.e., the first row of table 220 corresponding to U1. Additional normalized preference vectors for users U2-Un may be similarly derived from the corresponding raw preference vectors of table 210.

The normalized preference vectors within table 220 may also include a field for a user epoch. For the user U1, the preference vector includes then entry "2000:8" in the "epoch" field/column. The epoch indicates a time period range associated with the media programming consumption associated with the user. For instance, "2000" indicates the mean of the years of the media programs consumed by user U1 with a standard deviation of "8" years indicated by the latter part of the entry. The purpose of the user epoch is described further detail below in connection with the example of FIG. 4.

FIG. 3 illustrates and additional set 300 comprising a table 310 of preference vector calculations, a table 310 for consumption mode weight calculations, and a table 330 of normalized preference vectors with consumption mode weighting. Table 310 illustrates calculations for the cumulative and normalized values for the fields of the (normalized) preference vector for user U1 that appear in table 220 of FIG. 2. These calculations are illustrated in the first and second rows of table 310, respectively labeled as "U1 Cumulative" and "U1 Normalized". Table 310 also illustrates calculations for the cumulative and normalized values for the fields of a preference vector for user U1 that are consumption mode weighted. These calculations are illustrated in the third and fourth rows of table 310, respectively labeled as "U1 Cumulative ('' and "U1 Normalized". It should be noted that some modes of media content consumption may be less indicative of user interest than others. For example, a user may turn on a television and tune to a channel where a movie is being presented as live programming. However, the user may be simultaneously doing chores around the house and may not actually be paying attention to the media programming. On the other hand, "playback" or "on-demand" media programming consumption may be more indicative of actual user interest (or lack thereof), since the user may pause the media content and continue viewing the media content at a later time if the user is interrupted with other activities. In one example, there are no preferences assumed with regard to which modes of consumption are more relevant. Thus, in one example, rarer or less utilized modes of consumption are weighted more heavily.

To illustrate, table 320 shows the results of consumption mode weight calculations for four modes of consumption in accordance with Equation 1 and Equation 2 below:

$$\text{consumption\_mode\_interim\_factor}\_n = (\text{mode\_}n\_\text{count} - \text{total\_event\_count})^2 / \text{total\_event\_count} \quad \text{Equation 1:}$$

$$\text{consumption\_mode\_weight}\_n = \text{consumption\_mode\_interim\_factor}\_n / \text{sum\_consumption\_mode\_interim\_factors} \quad \text{Equation 2:}$$

In the present example, "mode_n_count" is the number of times that a mode "n" of consumption was used to present media programs associated with the user, and "total_event_count" is the total number of media programs presented via all modes of consumption under consideration. "consumption_mode_weight_n" is the weighting factor to be used in weighting entries associated with the mode "n" of consumption. It should be noted that "consumption_mode_interim_factor_n" is a variable that relates Equation 1 to Equation 2. However, in another example, Equations 1 and 2 may be collapsed into a single equation which omits this variable.

In one example, the calculations of table 320 may be related to the consumption of media programs regarding the same user U1 discussed above in connection with the example of FIG. 2. However, it should be noted that there is not necessarily a direct correspondence between the quantities of media programming assumed to be consumed by user U1 in connection with tables 210 and 220 and the quantities of media programming assumed to be consumed by user U1 in connection with table 320. Thus, the example of table 320 is provided for illustrative purposes only.

As illustrated in table 320 of FIG. 3, with respect to the "live" mode of consumption, there is a count of 10 media programs presented, or consumed, out of a total of 15 media programs presented. Following Equation 1, the consumption_mode_interim_factor_n for the "live" mode is therefore 1.66. The consumption_mode_interim_factor_n for the "purchase" mode, the "playback" mode, and the "download" mode may be similarly calculated as 13.06, 9.6 and 13.06 respectively. Following Equation 2, the respective consumption mode weights are thus calculated as 1.04, 1.35, 1.26 and 1.35.

In one example, consumption mode weighting involves, for a respective entry for a media program within a field of a raw preference vector, multiplying the percentage of the total duration of the media program which has been presented of by the consumption mode weighting factor for the mode of consumption that was used in connection with the presentation of that particular media program. To illustrate, with respect to the field of column 20 of the raw preference vector for user U1 in table 210, there are three entries: "2015:0.21", "2005:0.72" and "1992:0.80". The three entries may relate to media programs which were consumed via the "live" mode, "playback" mode and "purchase" mode respectively. Using the consumption mode weighting factors from table 320 of FIG. 3, the first entry may be weighted by multiplying the 0.21 by 1.04, the second entry may be weighted by multiplying the 0.72 by 1.26, and the third entry may be weighted by multiplying the 0.80 by 1.35. The sum of these weighted entries is 2.2, which is illustrated in the row of table 310 for "U1 Cumulative (Consumption Mode Weighted)", in particular, in the field corresponding to column 20. Similar calculations may be performed with respect to the entries within fields for the other columns 1, 7, 11 and 15. Example results are illustrated in the further entries within the row of table 310 for "U1 Cumulative (Consumption Mode Weighted). The entries in the following row of table 310, "U1 Normalized (Consumption Mode Weighted)" may be calculated, e.g., derived from the row of table 310 for "U1 Cumulative (Consumption Mode Weighted)" in a similar manner as described above in connection with the non-consumption mode weighted (normalized) preference vector of user U1 that is populated into table 220 of FIG. 2. Additional preference vectors for users U2-Un may be similarly calculated and populated into the table 330 and/or updated as the various users may consume additional media programs.

To further aid in understanding the present disclosure, FIG. 4 illustrates a set 400 of tables associated with converting a raw entity matrix into a media entity matrix 430 that is personalized to a user. Table 410 is an example of a raw entity matrix. In one example, the raw entity matrix, table 410, comprises a number of raw entity vectors, e.g., rows, for a number of entities E1, E2 . . . En that are associated with the production of various media programs, such as actors/actresses, directors, composers, etc. In one example, fields of each raw entity vector are associated with columns of the table 410. In the present example, there are five columns labeled as columns 1, 6, 7, 9 and 11, respectively. In one example, the fields, or columns, correspond to different attributes of various media programs. In one example, the fields of each raw entity vector (and hence the columns of the table 410) correspond to the same fields as the raw preference vectors and normalized preference vectors described above in connection with tables 210 and 220 of FIG. 2 and table 330 of FIG. 3. However, it should be noted that for ease of illustration, various columns/fields may be omitted from table 410, e.g., columns 2-6, 8-10, etc.

As illustrated in FIG. 4, the entries within the fields of each entity vector of table 410 comprise a year of a media program associated with the entity and a score, or rating for the media program (e.g., scaled between 0 and 1, or zero to 100 percent). A number of entries may appear in each field, depending upon the number of media programs associated with the entity that relate to the attribute of the field (or column). In the example vector for entity E1, it can be seen that the media programs associated with the entity relate to at least five attributes, e.g., the attributes assigned to columns 1, 6, 7, 9 and 11, respectively. In one example, entity vectors and the entries within the various fields of each entity vector are generated from at least one media program data set that includes a plurality of media records for a plurality of media programs. In one example, each media record of the plurality of media records includes: a set of one or more content attributes associated with one of the plurality of media programs, a set of one or more entities associated with the one of the plurality of media programs, a year of the one of the plurality of media programs, and a rating, or score for the one of the plurality of media programs. The ratings/scores may comprise media critic ratings or average user ratings, for example. Similarly, the attributes of the media program may be identified by the user who are providing the ratings, by one or more media critics, by an editor or a curator of the media program data set, and so forth.

Table 420 illustrates calculations for generating a normalized entity vector and a normalized, epoch weighted entity vector for entity E1. As illustrated in table 420, the first row "E1 Cumulative" comprises the cumulative sum of all of the scores/ratings for each of the respective fields/columns. The second row "E1 Normalized" comprises the cumulative sums for each of the respective fields/columns, divided by the highest cumulative sums selected from all of the respective fields in the row above for "E1 Cumulative", e.g., a max-value normalization. In the present example, the cumulative sums in the fields of columns 1, 6, 7, 9, and 11 are divided by 5.85, the highest cumulative sum, which is calculated for the field of column 11. The normalized scores/ratings therefore appear as the entries within the second row of table 420 for "E1 Normalized".

In one example, an entity matrix, and the entity vectors therein, may be personalized to a user. More specifically, the entity matrix may be personalized to the user based upon the user epoch. In one example, the user epoch indicates a range of years associated with the media programming consumption of a user. For instance, with respect to the user preference vector for user U1 contained in table 330 of FIG. 3, the user epoch is given by "2000:8", where "2000" indicates the mean of the years of the media programs consumed by user U1. A standard deviation of "8" years is indicated by the latter part of the entry. In other words, the user epoch is the year range of 1992-2008. An example of personalizing the entity vector for entity E1 to user U1 may include: even weighting (non-weighting) scores for entries relating to media programs that fall within the user epoch, and weighting scores for entries relating to media programs that are not within the user epoch according to Equation 3 below:

$$\text{weight}(y) = UDF^{\wedge}|51\ x-y| \qquad \text{Equation 3:}$$

In the present example, "weight (y)" is a weight factor, "x" is one of the limits of the epoch range, "y" is the year of a media program and "UDF" is a user-defined factor. In one example, the UDF may be selected to be 0.9. To illustrate, the first entry in field/column 1 for entity E1 in table 410 is "2002:0.71". Since the year 2002 is within the epoch range of user U1 (1992-2008), the score, 0.71, is unmodified. However, the next entry is "2012:0.64". Since 2012 is outside of the epoch range, the weight factor is calculated as 0.9^|2008-2012|=0.6561 according to Equation 3. Accordingly, the score of 0.64 is modified by multiplying by the weight factor 0.6561, resulting in a modified score of 0.42 (rounded to two decimal places). In one example, the entries in the respective fields/columns of the raw entity vector for entity E1 are processed in this way, and then the resulting scores are summed. An example of the result of such calculations is illustrated in the third row of table 420 "E1 Cumulative (User Epoch Weighted)." In one example, an entity vector personalized to the user U1 may further be generated by (max-value) normalizing the cumulative (user epoch weighted) scores in each of the fields of the entity vector for entity E1. For example, the fourth row of table 420 "E1 Normalized User Epoch Weighted" may comprise the results of dividing each of the entries in the third row of table 420 by the maximum value, e.g., 5.67 from field/column 11.

As further illustrated in FIG. 4, table 430 comprises a media entity matrix of entity vectors personalized to a user, e.g., user U1. An example is given in the first row where entries of the entity vector for entity E1 are personalized to the user U1. In the present example, the entries are the same as the entries of the last row in table 420. Similar calculations may be performed to populate the entity vectors of further rows of the personalized media entity matrix of table 430.

As mentioned above, examples of the present disclosure may determine entity rankings of entities associated with production of media programs and provide a recommendation based upon the entity rankings. In one example, the entity rankings may be determined by taking dot products between a user preference vector and the entity vectors of a media entity matrix. For example, the columns/fields of the table 430 may be the same columns/fields as contained within the table 220 of FIG. 2 and table 330 of FIG. 3. Thus, the dot product between a user preference vector for user U1, e.g., from table 220 (non-consumption mode weighted) or table 330 (consumption mode weighted), and an entity vector for entity E1, e.g., from table 430, may represent a relative degree of similarity between the attributes of media programming consumed by the user U1, and the media programming that is associated with the entity E1. In one example, a ranked list of entities may thus be created, where entities having entity vectors resulting in greater valued dot products (e.g., with respect to a normalized preference vector of user U1) may be ranked higher than entity vectors resulting in lower valued dot products. In one example, the recommendation may comprise a recommended entity, such as an actor/actress, director, composer, etc., or a recommended media content, based upon the ranking. For instance, the top entity, the top five entities, the top 10 entities, etc. may be provided as recommended entities. In another example, media programming associated with the top entity, the top five entities, the top 10 entities, etc. may be provided as recommended media programming. It should be noted that in one example, the dot products may be calculated with respect to entity vectors from a personalized media entity matrix (e.g., table 430). However, in another example, a non-personalized media entity matrix may be utilized. For example, a media entity matrix may include entity vectors that are normalized, such as the second row of table 420 ("E1 Normalized"), but which have not had entries personalized to a user epoch, e.g., according to Equation 3 above.

It should be noted that the examples of FIGS. 2-4 are provided for illustrative purposes, and that different data structures, different operations, and so forth may be implemented in connection with additional examples of the present disclosure. For example, the preference vectors of tables 210 and 220 of FIG. 2 and table 330 of FIG. 3 are illustrated as comprising rows of the respective tables. However, in another example, the preference vectors may be arranged as columns. In addition, although the raw preference vectors and normalized preference vectors are illustrated separately in connection with tables 210 and 220, in another example, a raw preference vector for a user and a corresponding normalized preference vector may be considered as the same data structure, but at different stages of processing, e.g., within the creation of the normalized preference vector being the final stage. The entity vectors and the entity matrices of tables 410 and 430 of FIG. 4 may similarly take a different form. In still another example, the epoch may be omitted as a field within the normalized preference vectors, and may be stored in a separate table or list of user epochs, for example. In addition, although the examples of FIGS. 2-4 are described in connection with the media program consumption of various users, it should be understood that the foregoing is equally applicable to media program consumption on a per-device basis, on a per-account basis, etc. As such, the preference vectors for "users" U1-Un may represent individual users, individual media devices, or group of devices associated with users, accounts, households, etc. Thus, these and other modifications may be implemented in additional examples of the present disclosure.

Figure 5:
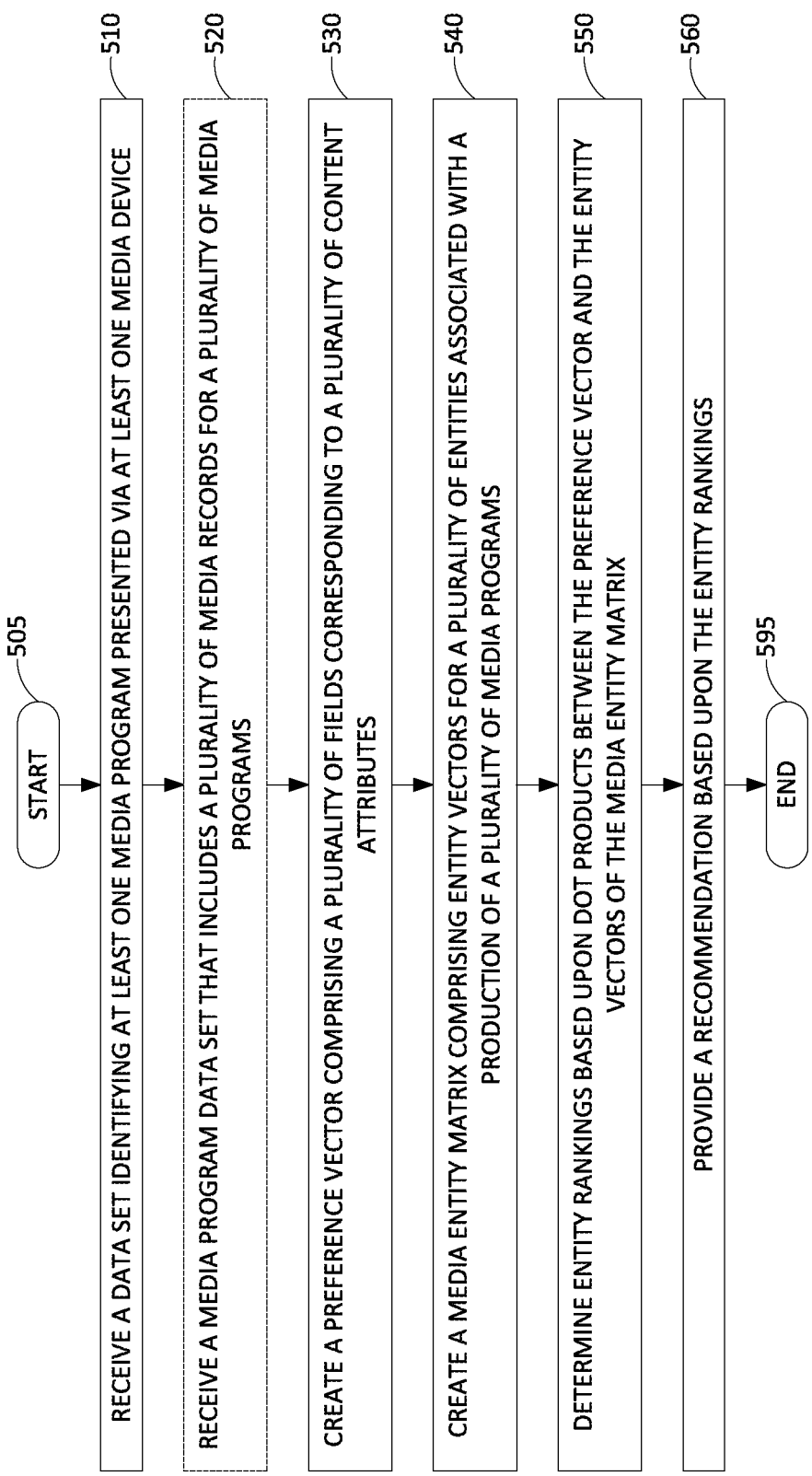
FIG. 5 illustrates a flowchart of a method for determining entity rankings of entities associated with production of media programs and providing a recommendation based upon the entity rankings, according to the present disclosure.

FIG. 5 illustrates a flowchart of a method 500 for determining entity rankings of entities associated with production of media programs and providing a recommendation based upon the entity rankings. In one embodiment, the method 500 is performed by the recommendation server 115 of FIG. 1, any one or more components thereof (e.g., a processor performing operations stored in and loaded from a memory), or any one or more other devices in a communication network, such as communication network 100 of FIG. 1. For instance, the method 500 may be performed by the recommendation server 115 in conjunction with one or more application servers 114 functioning as data storage devices. In still another example, the method 500 may be performed by a set top box. In one example, the steps, functions, or operations of method 500 may be performed by a computing device or system 600, and/or processor 602 as described in connection with FIG. 6 below. For instance, the computing device or system 600 may represent any one or more components of FIG. 1 that are configured to perform the steps, functions and/or operations of the method 500. For illustrative purposes, the method 500 is described in greater detail below in connection with an example performed by a processor, such as processor 502. The method 500 begins in step 505 and proceeds to step 510.

At step 510, the processor receives a data set identifying at least one media program presented via at least one media device. In one example, the at least one media device may be associated with a user and/or a subscriber account. In one example, the data set may be received from any one or more of a set top box, a television server, a smart TV, a cellular smart phone or other computing device, and so forth.

At optional step 520, the processor may receive a media program data set that includes a plurality of media records for a plurality of media programs. For example, the plurality of media programs may include the at least one media program presented via the at least one media device. In one example, each media record of the plurality of media records includes a set of one or more content attributes associated with one of the plurality of media programs, a set of one or more entities associated with the one of the plurality of media programs, a year of the one of the plurality of media programs, and a score for the one of the plurality of media programs. In one example, the media program data set is received from a device of a third-party, such as an entity that maintains a database storing information for various media programs, entities that are associated with such media programs, ratings for such media programs by critics and/or the general public, and so forth. The media programs may comprise, for example, films, movies, television programing, music programming, and so forth. In one example, at optional step 520 the processor may receive and store multiple media program data sets from different third-parties. For instance, the processor may combine multiple media program data sets into a composite media program data set. In another example, the processor may receive the media program data set(s) from one or more data storage devices, e.g., of a television service provider network. For instance, the one or more data storage devices may have previously received and stored the media program data set(s).

At step 530, the processor creates a preference vector comprising a plurality of fields corresponding to a plurality of content attributes. In one example, the creating the preference vector comprises generating preference vector entries in fields of the plurality of fields that correspond to content attributes associated with the at least one media program presented via the at least one media device. In one example, each of the preference vector entries comprise a playback duration of one of the at least one media program presented via the at least one media device and a year of the one of the at least one media program presented via the at least one media device. For example, at step 530 the processor may retrieve at least one media record associated with the at least one media program from the media program data set received at optional step 520, retrieve the content attributes from the at least one media record, and create the preference vector entries in the fields of the plurality of fields of the preference vector corresponding to the content attributes. In one example, for each media program of the at least one media program, a preference vector entry is created in one of the plurality of fields of the preference vector when a content attribute from the media record for the media program corresponds to the one of the plurality of fields.

Notably, each field of the plurality of fields of the preference vector may have zero preference vector entries, one preference vector entry, or more than one preference vector entry. For more than one entry, each of the preference vector entries in the field relates to a different media program. In one example, at step 520 the creating the preference vector further includes summing playback durations percentages of preference vector entries within the fields of the plurality of fields of the preference vector to generate cumulative playback duration percentages and normalizing the cumulative playback duration percentages, e.g., by sum normalizing. In one example, the playback duration percentages are consumption mode weighted prior to the summing. For example, the playback duration percentages may be consumption mode weighted according to the calculations of the example Equations 1 and 2 above.

At step 540, the processor creates a media entity matrix comprising entity vectors for a plurality of entities associated with a production of a plurality of media programs. In one example, the plurality of media programs comprises video programs. Accordingly, each entity of the plurality of entities may comprise: a cast member, a director, a production company, a composer, a writer, a host, a narrator, an illustrator, etc. In another example, the plurality of media programs comprises audio programs. Accordingly, each entity of the plurality of entities may comprise: a musician, a performer, a songwriter, a singer, a band, a band member, a record label, a production company, a narrator, a reporter, a host, etc.

In one example, each entity vector comprises the plurality of fields corresponding to the plurality of content attributes (i.e., the same content attributes for the fields of the preference vector). In one example, the creating the media entity matrix at step 540 comprises, for each entity vector for each of the plurality of entities, generating matrix entries in fields of the plurality of fields that correspond to content attributes associated with at least one media program associated with the entity. In one example, each matrix entry comprises a year of one of the at least one media program associated with the entity and a score of the one of the at least one media program associated with the entity. In one example, the plurality of media programs of the media program data set received at optional step 520 may include the at least one media program presented via the at least one media device and the at least one media program associated with the entity. In one example, the at least one media program presented via the at least one media device and the at least one media program associated with the entity may include a same media program or media programs. In any event, in one example, the processor may determine, from the media program data set received at optional step 520, the content attributes associated with the at least one media program associated with the entity, the year of the one of the at least one media program associated with the entity, and the score of the one of the at least one media program associated with the entity.

In one example, the score is weighted by an epoch factor that is based upon a time span that is associated with the at least one media program presented via the media device. In one example, the time span comprises a range of years based upon a mean of the years of the at least one media program presented via the media device and a standard deviation. In one example, for each entity vector for each of the plurality of entities, the matrix entries is weighted by the epoch factor by multiplying scores of the matrix entries by the epoch factor. For example, for each of the matrix entries, the epoch factor is a value of one (1) when the year of the matrix entry is within the range of years, and when the year of the matrix entry is not within the range of years, the epoch factor is a value calculated by raising a distribution factor to a power comprising a difference between a terminal year of the range of years and the year of the matrix entry, e.g., according to Equation 3 above. In one example, the distribution factor comprises a value of 0.9.

In one example, the creating the media entity matrix further comprises, for each entity vector for each of the plurality of entities: summing scores of matrix entries within the fields of the plurality of fields to generate cumulative scores for the fields of the plurality of fields, and normalizing the cumulative scores. In one example, the normalizing comprises max-value normalizing.

At step 550, the processor determines entity rankings based upon dot products between the preference vector and the entity vectors of the media entity matrix. For example, a dot product between the preference vector and one of the entity vectors may measure a relative degree of similarity between the attributes of media programs presented via the at least one media device, and the media programs that are associated with the entity of the entity vector. In one example, a ranked list of entities may thus be created, where entities having entity vectors resulting in greater valued dot products may be ranked higher than entity vectors resulting in lower valued dot products.

At step 560, the processor provides a recommendation based upon the entity rankings. In one example, the providing the recommendation comprises transmitting the recommendation to the media device. In one example, the recommendation includes a recommended entity based upon the entity rankings. For example, the recommended entity may comprise the top ranked entity based upon the results of step 550, a top five ranked entity, a top ten ranked entity, or the like. Alternatively, or in addition the recommendation may include a recommended media program that is associated with a recommended entity based upon the entity rankings. For instance, the recommendation may include a film, television program, a song, an album, or the like that is associated with the recommended entity.

Following step 560, the method 500 proceeds to step 595 where the method ends.

In addition, although not expressly specified above, one or more steps of method 500 may include a storing, displaying and/or outputting step as required for a particular application. In other words, any data, records, fields, and/or intermediate results discussed in the method can be stored, displayed and/or outputted to another device as required for a particular application. Furthermore, operations, steps or blocks in FIG. 5 that recite a determining operation or involve a decision do not necessarily require that both branches of the determining operation be practiced. In other words, one of the branches of the determining operation can be deemed as an optional step. Furthermore, operations, steps or blocks of the above described method(s) can be combined, separated, and/or performed in a different order from that described above, without departing from the example embodiments of the present disclosure.

Figure 6:
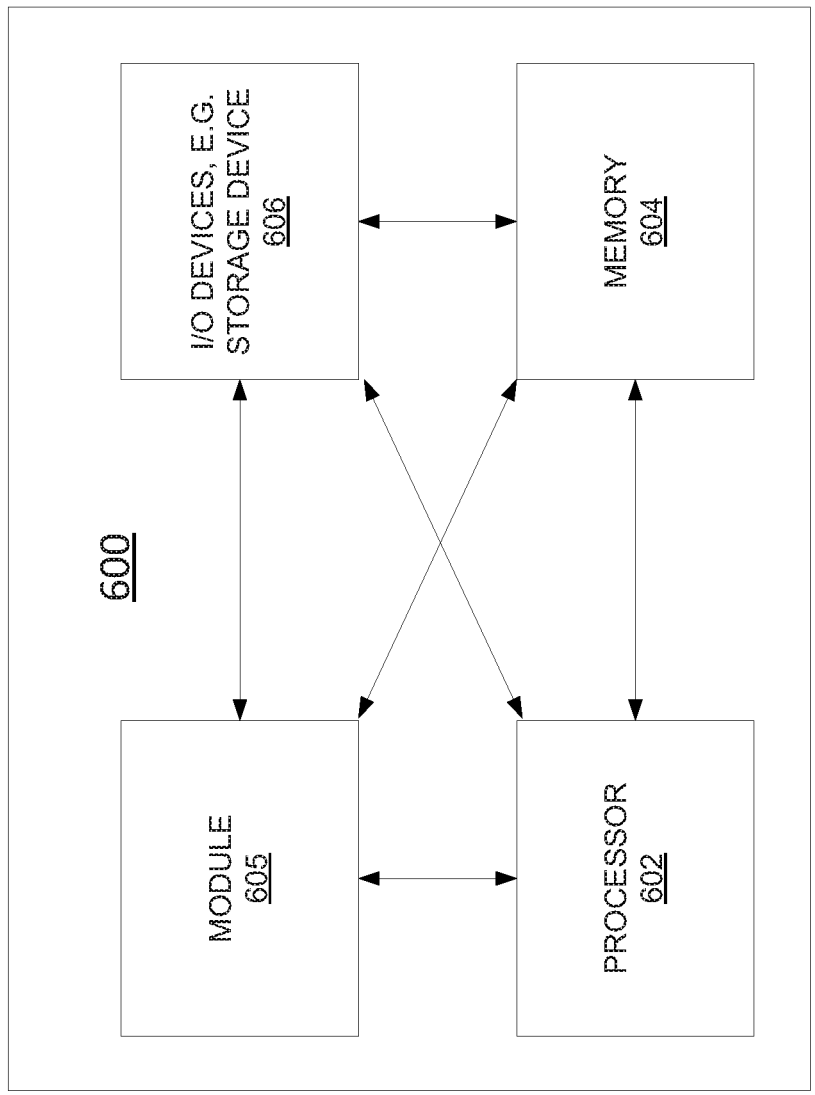
FIG. 6 illustrates a high level block diagram of a computing device specifically programmed to perform the steps, functions, blocks and/or operations described herein.

FIG. 6 depicts a high-level block diagram of a computing device specifically programmed to perform the functions described herein. For example, any one or more components or devices illustrated in FIG. 1 or described in connection with the method 500 may be implemented as the system 600. As depicted in FIG. 6, the system 600 comprises a hardware processor element 602 (e.g., a microprocessor, a central processing unit (CPU) and the like), a memory 604, (e.g., random access memory (RAM), read only memory (ROM), a disk drive, an optical drive, a magnetic drive, and/or a Universal Serial Bus (USB) drive), a module 605 for determining entity rankings of entities associated with production of media programs and providing a recommendation based upon the entity rankings, and various input/output devices 606, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one processor element is shown, it should be noted that the general-purpose computer may employ a plurality of processor elements. Furthermore, although only one general-purpose computer is shown in the Figure, if the method(s) as discussed above is implemented in a distributed or parallel manner for a particular illustrative example, i.e., the steps of the above method(s) or the entire method(s) are implemented across multiple or parallel general-purpose computers, then the general-purpose computer of this Figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a general purpose computer or any other hardware equivalents, e.g., computer readable instructions pertaining to the method(s) discussed above can be used to configure a hardware processor to perform the steps, functions and/or operations of the above disclosed method(s). In one embodiment, instructions and data for the present module or process 405 for determining entity rankings of entities associated with production of media programs and providing a recommendation based upon the entity rankings (e.g., a software program comprising computer-executable instructions) can be loaded into memory 604 and executed by hardware processor element 602 to implement the steps, functions or operations as discussed above in connection with the example method 500. Furthermore, when a hardware processor executes instructions to perform "operations", this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 605 for determining entity rankings of entities associated with production of media programs and providing a recommendation based upon the entity rankings (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described example embodiments, but should be defined only in accordance with the following claims and their equivalents.

What is claimed is:

1. A device comprising:
    a processor; and
    a computer-readable medium storing instructions which, when executed by the processor, cause the processor to perform operations, the operations comprising:
        receiving a data set identifying at least one media program presented via a media device;
        creating a preference vector comprising a plurality of fields corresponding to a plurality of content attributes, wherein the creating the preference vector comprises generating preference vector entries in fields of the plurality of fields that correspond to content attributes associated with the at least one media program presented via the media device, wherein each of the preference vector entries comprises a playback duration of one of the at least one media program presented via the media device and a time period of the one of the at least one media program presented via the media device;

creating a media entity matrix comprising entity vectors for a plurality of entities associated with a production of a plurality of media programs, wherein each entity vector comprises the plurality of fields corresponding to the plurality of content attributes, wherein the creating the media entity matrix comprises, for each entity vector for each entity of the plurality of entities, generating matrix entries in fields of the plurality of fields that correspond to content attributes associated with at least one media program associated with the each entity, wherein each matrix entry comprises a time period of one of the at least one media program associated with the each entity and a score of the one of the at least one media program associated with the each entity, wherein the score is weighted by an epoch factor that is based upon a time span that is associated with the at least one media program presented via the media device;

determining entity rankings based upon dot products between the preference vector and the entity vectors of the media entity matrix; and providing a recommendation based upon the entity rankings.

2. The device of claim 1, wherein the creating the media entity matrix further comprises, for each entity vector for each entity of the plurality of entities:

summing scores of matrix entries within the fields of the plurality of fields to generate cumulative scores for the fields of the plurality of fields; and normalizing the cumulative scores.

3. The device of claim 1, wherein the operations further comprise:

receiving a media program data set that includes a plurality of media records for a plurality of media programs, the plurality of media programs including the at least one media program presented via the media device and the at least one media program associated with the each entity, each media record of the plurality of media records including: a set of one or more content attributes associated with one of the plurality of media programs, a set of one or more entities associated with the one of the plurality of media programs, a time period of the one of the plurality of media programs, and a score for the one of the plurality of media programs.

4. The device of claim 3, wherein the creating the preference vector comprises:

retrieving at least one media record from the media program data set associated with the at least one media program;

retrieving the content attributes from the at least one media record; and creating the preference vector entries in the fields of the plurality of fields of the preference vector corresponding to the content attributes, wherein for each media program of the at least one media program a preference vector entry is created in one of the plurality of fields of the preference vector when a content attribute from the media record for the media program corresponds to the one of the plurality of fields.

5. The device of claim 4, wherein each field of the plurality of fields of the preference vector may have zero preference vector entries, one preference vector entry, or more than one preference vector entry.

6. The device of claim 3, wherein the creating the media entity matrix comprises, for each entity vector for each entity of the plurality of entities:

determining, from the media program data set, the at least one media program associated with the each entity; and determining, from the media program data set, the content attributes associated with the at least one media program associated with the each entity.

7. The device of claim 6, wherein the time period of the one of the at least one media program associated with the each entity and the score of the one of the at least one media program associated with the each entity are determined from the media program data set.

8. The device of claim 1, wherein the plurality of media programs comprises a video program, wherein the each entity of the plurality of entities comprises: a cast member, a director, a production company, a composer, a writer, a host, a narrator, or an illustrator.

9. The device of claim 1, wherein the plurality of media programs comprises audio programs, wherein the each entity of the plurality of entities comprises: a musician, a performer, a songwriter, a singer, a band, a band member, a record label, a production company, a narrator, a reporter, or a host.

10. The device of claim 1, wherein the time span comprises a range of years based upon a mean of the time periods of the at least one media program presented via the media device and a standard deviation.

11. The device of claim 10, wherein for each entity vector for each entity of the plurality of entities the matrix entries are weighted by the epoch factor by multiplying scores of the matrix entries by the epoch factor, wherein for each of the matrix entries, the epoch factor is a value of one when the time period of the matrix entry is within the range of years, and when the time period of the matrix entry is not within the range of years, the epoch factor is a value calculated by raising a distribution factor to a power comprising a difference between a terminal year of the range of years and the time period of the matrix entry.

12. The device of claim 11, wherein the distribution factor comprises a value of 0.9.

13. The device of claim 1, wherein the recommendation includes a recommended entity based upon the entity rankings.

14. The device of claim 1, wherein the recommendation includes a recommended media program that is associated with a recommended entity based upon the entity rankings.

15. The device of claim 1, wherein the creating the preference vector further comprises:

summing playback durations of preference vector entries within the fields of the plurality of fields of the preference vector to generate cumulative playback durations; and normalizing the cumulative playback durations.

16. The device of claim 15, wherein the playback durations are consumption mode weighted prior to the summing.

17. The device of claim 16, wherein the normalizing comprises sum normalizing.

18. The device of claim 1, wherein the media device comprises a set top box or a television, wherein the providing the recommendation comprises transmitting the recommendation to the media device.

19. A non-transitory computer-readable medium storing a plurality of instructions which, when executed by a processor, cause the processor to perform operations, the operations comprising:

receiving a data set identifying at least one media program presented via a media device;

creating a preference vector comprising a plurality of fields corresponding to a plurality of content attributes, wherein the creating the preference vector comprises generating preference vector entries in fields of the plurality of fields that correspond to content attributes associated with the at least one media program presented via the media device, wherein each of the preference vector entries comprises a playback duration of one of the at least one media program presented via the media device and a time period of the one of the at least one media program presented via the media device;

creating a media entity matrix comprising entity vectors for a plurality of entities associated with a production of a plurality of media programs, wherein each entity vector comprises the plurality of fields corresponding to the plurality of content attributes, wherein the creating the media entity matrix comprises, for each entity vector for each entity of the plurality of entities, generating matrix entries in fields of the plurality of fields that correspond to content attributes associated with at least one media program associated with the each entity, wherein each matrix entry comprises a time period of one of the at least one media program associated with the each entity and a score of the one of the at least one media program associated with the each entity, wherein the score is weighted by an epoch factor that is based upon a time span that is associated with the at least one media program presented via the media device;

determining entity rankings based upon dot products between the preference vector and the entity vectors of the media entity matrix; and providing a recommendation based upon the entity rankings.

20. A method comprising:

receiving, by a processor, a data set identifying at least one media program presented via a media device;

creating, by the processor, a preference vector comprising a plurality of fields corresponding to a plurality of content attributes, wherein the creating the preference vector comprises generating preference vector entries in fields of the plurality of fields that correspond to content attributes associated with the at least one media program presented via the media device, wherein each of the preference vector entries comprises a playback duration of one of the at least one media program presented via the media device and a time period of the one of the at least one media program presented via the media device;

creating, by the processor, a media entity matrix comprising entity vectors for a plurality of entities associated with a production of a plurality of media programs, wherein each entity vector comprises the plurality of fields corresponding to the plurality of content attributes, wherein the creating the media entity matrix comprises, for each entity vector for each entity of the plurality of entities, generating matrix entries in fields of the plurality of fields that correspond to content attributes associated with at least one media program associated with the each entity, wherein each matrix entry comprises a time period of one of the at least one media program associated with the each entity and a score of the one of the at least one media program associated with the each entity, wherein the score is weighted by an epoch factor that is based upon a time span that is associated with the at least one media program presented via the media device;

determining, by the processor, entity rankings based upon dot products between the preference vector and the entity vectors of the media entity matrix; and providing, by the processor, a recommendation based upon the entity rankings.

\* \* \* \* \*